UNITED STATES PATENT OFFICE.

JOHN H. WALES, OF NEW YORK, N. Y.

FILLER FOR ICE-CREAM.

1,063,481.      Specification of Letters Patent.      Patented June 3, 1913.

No Drawing.      Application filed May 23, 1910. Serial No. 563,037.

*To all whom it may concern:*

Be it known that I, JOHN H. WALES, a citizen of the United States, residing at 55 East Twenty-first street, New York, county of New York, State of New York, have invented a certain new and useful Improvement in Fillers for Ice-Cream, of which the following is a specification.

My invention relates to a filler or body giver for ice cream, sherbets, whipped cream, &c., the purpose of the invention being to produce a filler which is entirely wholesome, and, at the same time capable of giving the quality desired to the finished product, and also being easy to handle and free from dust.

The essential ingredients which are mixed with sugar in making up the filler consist of a small proportion of some edible oil, such, for example, as olive oil, peanut oil, &c., and a considerably larger portion of powdered edible gum, such as gum arabic or gum tragicanth, egg albumen, to which may be added a small proportion of cereals such as wheat, rye flour, corn starch, &c.

In making up the compound, I proceed as follows; and in the following description will name the proportions which I have found give the best results, it being understood, however, that the proportions may be varied to a reasonable extent without departing from the invention: Starting with 160 parts of sugar, I add seven parts of oil and mix until the oil is wholly incorporated. I next add 60 parts of powdered gum, and, in some cases, a small proportion of some of the cereals, such as wheat, corn starch, &c. After the ingredients are thoroughly mixed, the filler is sifted and is ready to use, the resulting powder being somewhat moist and entirely free from dust.

What I claim is:

1. A filler for ice cream, &c., comprising sugar with which is incorporated a small proportion of edible oil and a much larger proportion of powdered edible gum.

2. The herein described filler for ice cream, &c., comprising 160 parts granulated sugar, seven parts edible oil and sixty parts powdered edible gum.

3. The herein described filler for ice cream, &c., which consists of 160 parts granulated sugar, seven parts edible oil, sixty parts powdered edible gum and a small amount of a cereal product.

JOHN H. WALES.

Signed in presence of—
    LOUIS N. CHAPMAN,
    GEORGE W. WALES.